United States Patent
Yan et al.

(10) Patent No.: US 7,807,032 B2
(45) Date of Patent: Oct. 5, 2010

(54) BORON SEPARATION AND RECOVERY

(75) Inventors: Jinying Yan, Vällingby (SE); Anna Velin, Kungsängen (SE); Bernt Bengtsson, Varobacka (SE)

(73) Assignee: Vattenfall AB, Stockholm (SE)

( * ) Notice: Subject to any disclaimer, the term of this patent is extended or adjusted under 35 U.S.C. 154(b) by 1212 days.

(21) Appl. No.: 10/559,877

(22) PCT Filed: Jun. 23, 2003

(86) PCT No.: PCT/SE03/01076
§ 371 (c)(1), (2), (4) Date: Apr. 10, 2006

(87) PCT Pub. No.: WO2004/112943
PCT Pub. Date: Dec. 29, 2004

(65) Prior Publication Data
US 2006/0249390 A1 Nov. 9, 2006

(51) Int. Cl.
*B01D 61/48* (2006.01)
(52) U.S. Cl. .............. 204/520; 204/524; 204/528; 204/529; 204/533; 204/536
(58) Field of Classification Search .............. 204/520, 204/524, 528, 529, 533, 536
See application file for complete search history.

(56) References Cited

U.S. PATENT DOCUMENTS 4,148,708 A 4/1979 Grant
6,656,338 B2 * 12/2003 Meintker et al. .......... 204/536

FOREIGN PATENT DOCUMENTS

EP 1075868 2/2001
WO WO 02096807 12/2002
WO WO 03031034 4/2003

* cited by examiner

*Primary Examiner*—Arun S Phasge
(74) *Attorney, Agent, or Firm*—Dickstein Shapiro LLP

(57) ABSTRACT

A process is provided for separating, concentrating and recovery of boron compound from aqueous solution containing boron, strongly dissociated anions and some cations. The process specifically integrates electrodialysis with ion exchange to selectively separate boron from aqueous solution that contains a wide concentration range of boron, strongly ionised anions such as chloride, nitrate and sulfate, and cations like lithium. The process is adapted for controlling boron concentration in an industrial process, for the recovery or purification of boron and some cations like lithium form aqueous solutions, and for wastewater treatment.

17 Claims, 3 Drawing Sheets

BORON SEPARATION AND RECOVERY

TECHNICAL FIELD OF THE INVENTION

The present invention relates to a process for separating, concentrating and recovery of boron compound from aqueous solution containing boron, strongly dissociated anions and some cations. More specifically, it relates to an integrated process with electrodialysis and ion exchange to selectively separate boron from the aqueous solution that contains a wide concentration range of boron, strongly ionised anions such as chloride, nitrate and sulfate, and cations like lithium. The process can be used for controlling boron concentration in an industrial process, the recovery and purification of boron and wastewater treatment.

BACKGROUND ART

Most nature waters contain boron in a very low concentration, for example the boron concentration of a drinking water is usually much lower than 5 ppm. However, the boron concentration in an industrial processing water may be quite different. In the primary coolant of pressured water reactor (PWR) of nuclear power plant, the range of boron concentration may vary from 2000 ppm to a few ppm in order to control the reactivity of reactor. In addition, a large volume of slightly radioactive wastewater containing boron primarily as boric acid may be annually generated from this type of nuclear power plant. The wastewater is required for treatment. Therefore, an efficient process or a method used for boron separation is essential for controlling the industrial process and for the wastewater treatment.

Boron compounds like boric acid are widely used as raw material for industries particularly in the areas of glass, ceramics and enamels. Boric acid is also used as a starting chemical for production of borate salts, boron phosphate, fluoroborate, borate esters and metal alloys. A cost-efficient process for separation or recovery of boron is required for these industries.

Boron mostly presents as a weakly dissociated anion in normal aqueous solution. The distribution of boron species depends on the pH of solution and the concentration of boron (CRC, 2001). In a low concentration of solution with a pH of around 5, most of the boron exits as boric acid, $H_3BO_3$, which is an uncharged species. At an increased pH of up to 10 the anion form of boron, $H_2BO_3^-$, becomes dominant. In a high concentration of solution such as in the primary coolant of pressured water reactor (PWR), boron may be distributed in six species such as boric acid, tetrahydroxyborate ($B(OH)_4^-$), septahydroxydiborate ($B_2(OH)_7^-$), decahydroxytriboroate ($B_3(OH)_{10}^-$), tetradecahydroxytetraborate ($B_4(OH)_{14}^{2-}$), and octadecahydroxypentaborate ($B_5(OH)_{18}^{3-}$) (Sperssard, 1970). A general equilibria among these species can be expressed as follows:

$$xH_3BO_3 + yOH^- \Leftrightarrow B_x(OH)_{3x}^{-y} \quad (1)$$

The polymerisation of boric acid easily takes place in a high concentration of boron solution (B>1000 ppm).

There are serious challenges for the separation and recovery of boron from aqueous solution, because boron mostly presents as non-dissociated boric acid in neutral or weakly basic solutions. The rejection of boron in a reverse osmosis system is low (between 40-60%) under normal operating conditions, although an increase in the rejection may be achieved at pH of 9.5 or above (Prates et al., 2000). The non-dissociated boron cannot be removed by conventional ion-exchange technique since ion-exchange resin can only exchange ionised substances. Electrically driven membrane techniques such as electrolysis or electrodialysis are not suitable for the separation of boron because uncharged species cannot be easily migrated in an electrical field (Melnik et al., 1999).

There is an approach to remove boron using boron-selective resins (chelating resins) with diols as the complexing agents of boron (Nadav, 1999; Simonnot et al., 2000; Wilcox et al., 2000). However, it is usually expensive and requires a complicated regeneration procedure. Moreover, the recovery of boron requires a selective separation of boron from other anions such as chloride, nitrate and sulfates in aqueous solution.

A technique so-called electrodeionisation (EDI), which combined electrodialysis and ion-exchange, was used to remove ionisable species from aqueous solution by Kollsman et al., (U.S. Pat. Nos. 2,689,826 and 2,815,320). Improved EDI systems were disclosed and commercialised by Giuffrida et al., (U.S. Pat. Nos. 4,925,541 and 4,931,160), Ganizi et al., (U.S. Pat. Nos. 5,308,466 and 5,316,637), and Springthorpe et al., (U.S. Pat. No. 5,868,915) for the purification of waters. The most of electrodeionisation systems and apparatus were used for water purification and removing relatively low concentration of ionised contaminants from water. Although it has been reported that EDI can remove some weakly dissociated anions like carbonates, it is still a challenge for the EDI to remove trace boric acid and silica from aqueous solution. Moreover, the EDI has not been used for the purposes of separation, recovery or purification of weakly ionisable compounds like boric acid.

SUMMARY OF THE INVENTION

One of the objectives of the present invention is to provide an integrated process for efficient dissociation of weakly ionisable boric acid, by which boric acid can be easily separated through ion-exchange and electrical migration.

The second objective of the invention is to recover the separated boron and cation such as lithium for further reuse. Therefore the separated boron and/or lithium should be relatively purified and concentrated.

The third objective of the invention is selectively separation of boron from strongly dissociated anions such as chloride, nitrate and sulfate if an aqueous solution contains such contaminant anions.

Another objective of the invention is to improve the efficiency of the system by choosing suitable types of ion-exchange resins and the configuration of ion-exchange beds filled in an electrochemical cell.

These objectives are achieved by an integrated process comprising:
- separating strongly dissociated anions in the form of electrical migration performed in one diluting compartment of an electrochemical cell, which is filled with cation-exchange materials;
- separating dissociated cations such as $^7Li^+$ in the form of ion-exchange/electrical migration in the same compartment above;
- separating boron in the form of electrochemical/chemical dissociation, ion-exchange/adsorption, and electrical migration performed in another diluting compartment filled by anion-exchange material only, or a mixture of anion- and cation-exchange materials, or layers separated between the anion- and cation-materials;

recovering the separated cations into the catholyte compartment of the electrochemical cell;

recovering the separated boron into the anolyte compartment of the electrochemical cell;

recirculating the anolyte in the anolyte compartment;

recirculating the catholyte in the catholyte compartment; and recirculating the diluted solution in the diluting compartment if necessary.

In a preferred embodiment the integrated process comprises:

an electrodialysis-ion exchange system generally using a five-compartment electrochemical cell filled with ion-exchange resins in the diluting compartments as shown in FIG. 1;

the separation of boric acid from strongly dissociated anions by arranging the resin configuration and controlling the DC current for the electrochemical dissociation of boric acid;

the electrochemical dissociation of boric acid by applying a certain DC current to the electrochemical cell;

the chemical dissociation of boric acid by the regenerated anion-exchange resin filled in the electrochemical cell to create a relatively high local pH on the surface of resin beads;

the adsorption of the dissociated boron on the anion resin, and the adsorption of dissociated cations on the cation resin;

the migration of the adsorbed anions through an anion-exchange membrane and concentrated in the anode compartment, and the migration of adsorbed cations through a cation-exchange membrane and concentrated in the cathode compartment.

DETAILED DESCRIPTION OF PREFERRED EMBODIMENTS OF THE INVENTION

Figure 1:
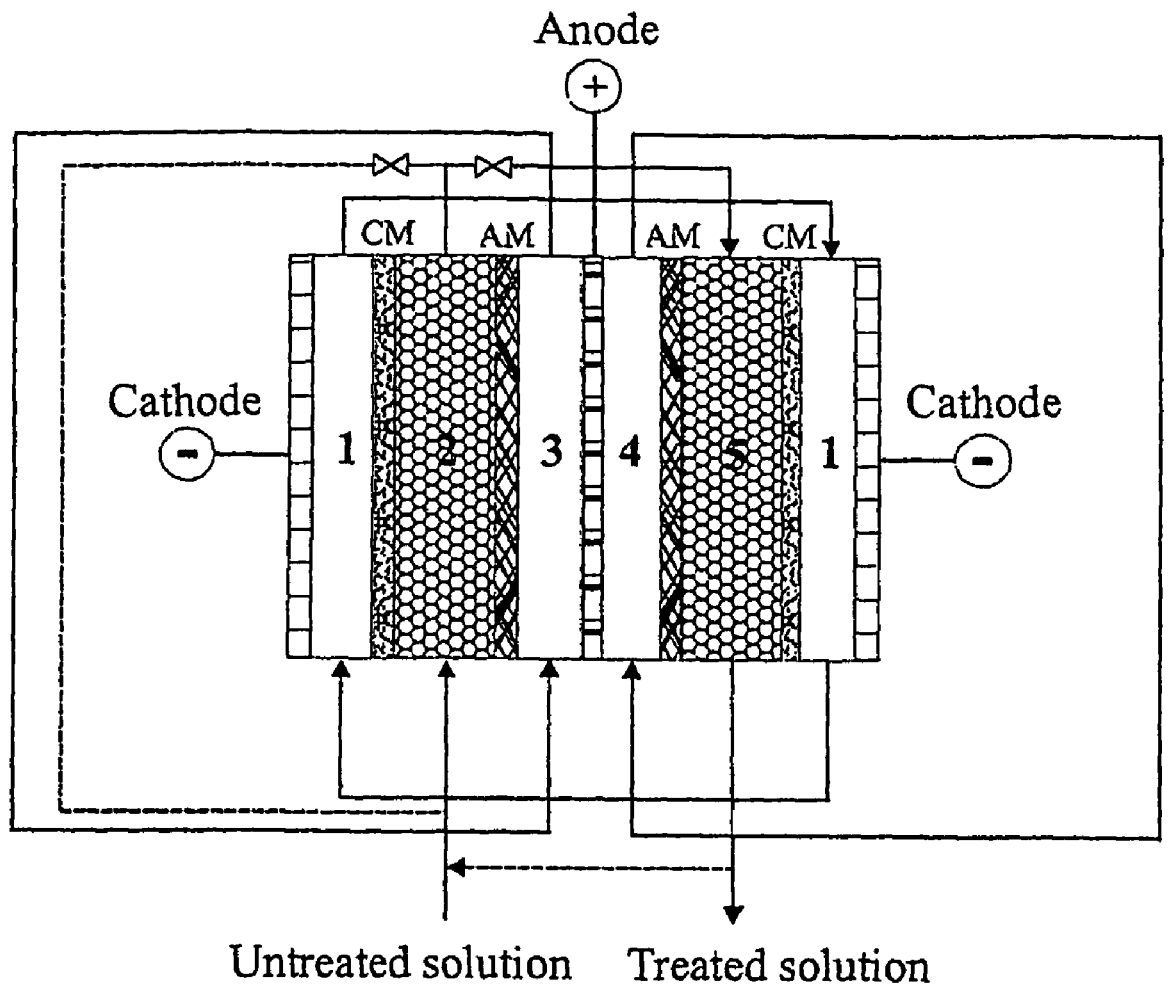
FIG. 1 shows a typical configuration of the system to perform the process of the present invention.

The process is performed by an electrodialysis-ion exchange system typically consisted of a five-compartment electrochemical cell as shown in FIG. 1. The compartment 1 is a cathode compartment used for the recirculation of catholyte and collecting separated cations. The compartment 2 is one of the diluting compartments, in which cation-exchange material is filled and ionisable anions can directly be migrated by DC potential through the anion membrane AM into the anolyte compartment (compartment 3). At the same time the cations can also be removed by ion-exchange/migration through the cation membrane CM into the catholyte compartment (compartment 1). The compartment 3 as mentioned above is one of the anode compartments used for the recirculation of anolyte and collecting the ionisable anions. The compartment 4 is another anode compartment used for the recirculation of anolyte and collecting the boron removed from the compartment 5. The compartment 5 is another diluting compartment, in which anion-exchange material is filled, and boric acid is ionised by electrochemical/chemical dissociation, adsorbed by the anion-exchange material, then migrated by DC potential through the anion membrane into the anolyte compartment 4. The dissociated cations can also be migrated from the compartment 5 through the cation membrane into the catholyte compartment.

The process of boron separation and recovery generally involves several mechanisms. First, boric acid should be ionised by electrochemical/chemical dissociation. The electrochemical dissociation of boric acid can be considered as a mechanism to be similar to salt splitting in electrolysis:

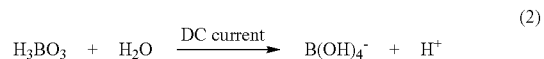

It should be mentioned that the boric acid splitting is not easily performed in a conventional electrodialysis system, because the electric resistance of non-dissociated boric acid is quite high so that the DC current is limited in a very low level by which boric acid cannot be split. However, as ion-exchange resin is filled in the diluting compartments the resistance of the electrochemical cell is significantly reduced and high level DC current can be applied for boric acid splitting.

Secondly, the chemical dissociation of boric acid may also take place on the resin. Suppose the anion resins have been regenerated in OH form, the dissociation of boric acid should be carried out on the surface of the anion-exchange resin beads:

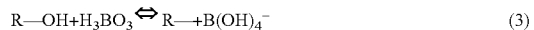

Then, the dissociated borate should immediately be adsorbed by the anion-exchange resins.

This mechanism has been confirmed by the initial adsorption of boric acid by the well-regenerated anion-exchange resin. It has been found that amount of boric acid can be adsorbed by the anion resin regenerated in OH form even as the pH of the boric acid solution is between 5 to 6.

The chemical dissociation/adsorption may be combined with the electrochemical dissociation of boric acid, because the quantity of the adsorbed boric acid cannot be explained only by the electrochemical dissociation of boric acid compared to the corresponding applied DC current.

The another mechanism is the ionic migration induced by electrical driving force. When direct current is applied between the anode and the cathode, the borate ions adsorbed on the anion resins are migrated through the anion membrane into the anolyte compartment.

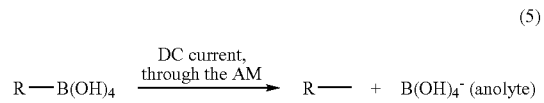

Finally, water splitting may occur on the surface of ion-exchange resin beads as an electrical current is applied.

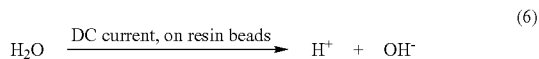
(6)

The water splitting provides hydroxyl ions and protons for the regeneration of anion-exchange resin and the regeneration of cation-exchange resin respectively. This makes the boron separation process to be continued.

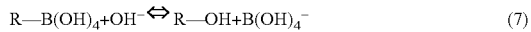
(7)

The cation separation process can be described as follows. Suppose the cation-exchange resin has been regenerated in H form and boric acid is mixed with LiOH in the untreated solution. The lithium ions for example $^7Li^+$ should directly be adsorbed by the cation resins filled in the diluting compartment during the separation.

(8)

The lithium ions adsorbed on the cation resins are then migrated through the cation membrane into the catholyte compartment.

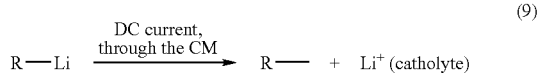
(9)

The cation resins can be regenerated using the protons generated from the water splitting (reaction 6). Therefore the cation separation is continued.

(10)

As the solution contains other anion contaminants such as chloride, nitrate or sulfate, the separation of boric acid from the strongly dissociated anions can be achieved in a diluting compartment filled with cation resin. Most of the boron spices are in a non-dissociated form like boric acid, as the pH of the solution is near neutral or weakly acid, and if the DC current applied for the electrochemical cell is controlled in a relatively low level. Under the conditions above, the strongly dissociated anions such as chloride, nitrate and sulfate are directly migrated from the diluting compartment by the DC potential. However the non-dissociated boric acid is still kept in solution. At the same time the dissociated cations can also be separated from the anions and the non-dissociated boric acid.

The separation of boric acid from strongly dissociated anions requires a front diluting compartment filled with cation-exchange material followed by another diluting compartment filled with anion-exchange material. The configuration of front cation resin bed and back anion resin bed should benefit the boron separation because the front cation resin bed provides a good condition for the regeneration of anion resin in the following anion resin bed.

Figure 2:
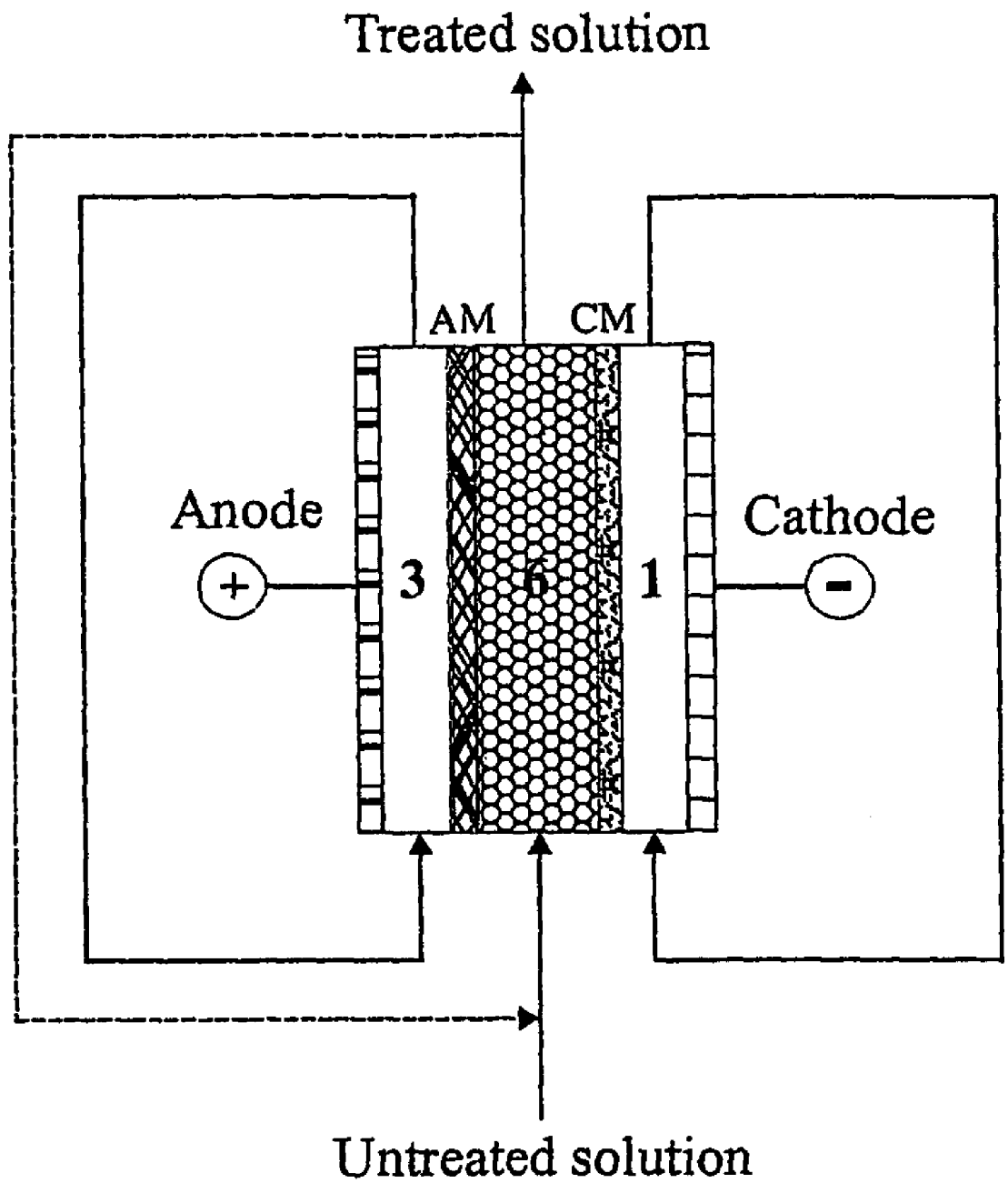
FIG. 2 shows a simplified system used for the boron separation from a relatively pure solution containing very low concentration of strongly dissociated anions, in which the separation of boron from the strongly dissociated anions is not considered.

The process of boron separation and recovery can generally be performed in two models as indicated in FIG. 1. The solid lines show the flow diagram of a follow-through model. A recirculating model includes the dash line. In addition, the process can be simplified to a three-compartment system as showed in FIG. 2. The simplified process can be used for the boron separation from a relatively pure solution containing very low concentration of strongly dissociated anions, in which the separation of boron from the strongly dissociated anions is not considered. The simplified process can also be used for the recovery and purification of lithium like $^7Li$.

The ion-exchange material filled in the diluting compartment 2 (FIG. 1) should be cation resin or other cation exchange materials. The ion-exchange materials filled in the diluting compartment 5 can be a single bed of anion resin or other anion exchange materials. The diluting compartment 5 may also be filled with a mixture of cation and anion resins or similar ion-exchange materials, or filled by a multiply-layer bed with separated anion resin and cation resin. The diluting compartment 6 (FIG. 2) in a simplified process should be filled with anion-exchange material and cation-exchange material. The resin bed can be a mixture of the anion resin and cation resin or separated between cation resin and anion resin. The cation resin should be put in front of anion resin if a separated resin bed is used for the separation. The performance of the system was much better if the mixed ion-exchange resins have the same particle size for both cation and anion resins compared to a combination of conventional cation and anion resins.

EXAMPLES

The process of boron separation and recovery is demonstrated in the following examples. A pilot testing of electrochemical cell (FIG. 3) was used to perform the process. The major specifications of the testing pilot are shown in Table 1. The properties of the ion-exchange membranes and resins used for the tests are given in Table 2 and Table 3, respectively. The initial pH of the boron containing solution used for treatment ranged from 5 to 6 depending on the concentrations of boron and other species.

Figure 3:
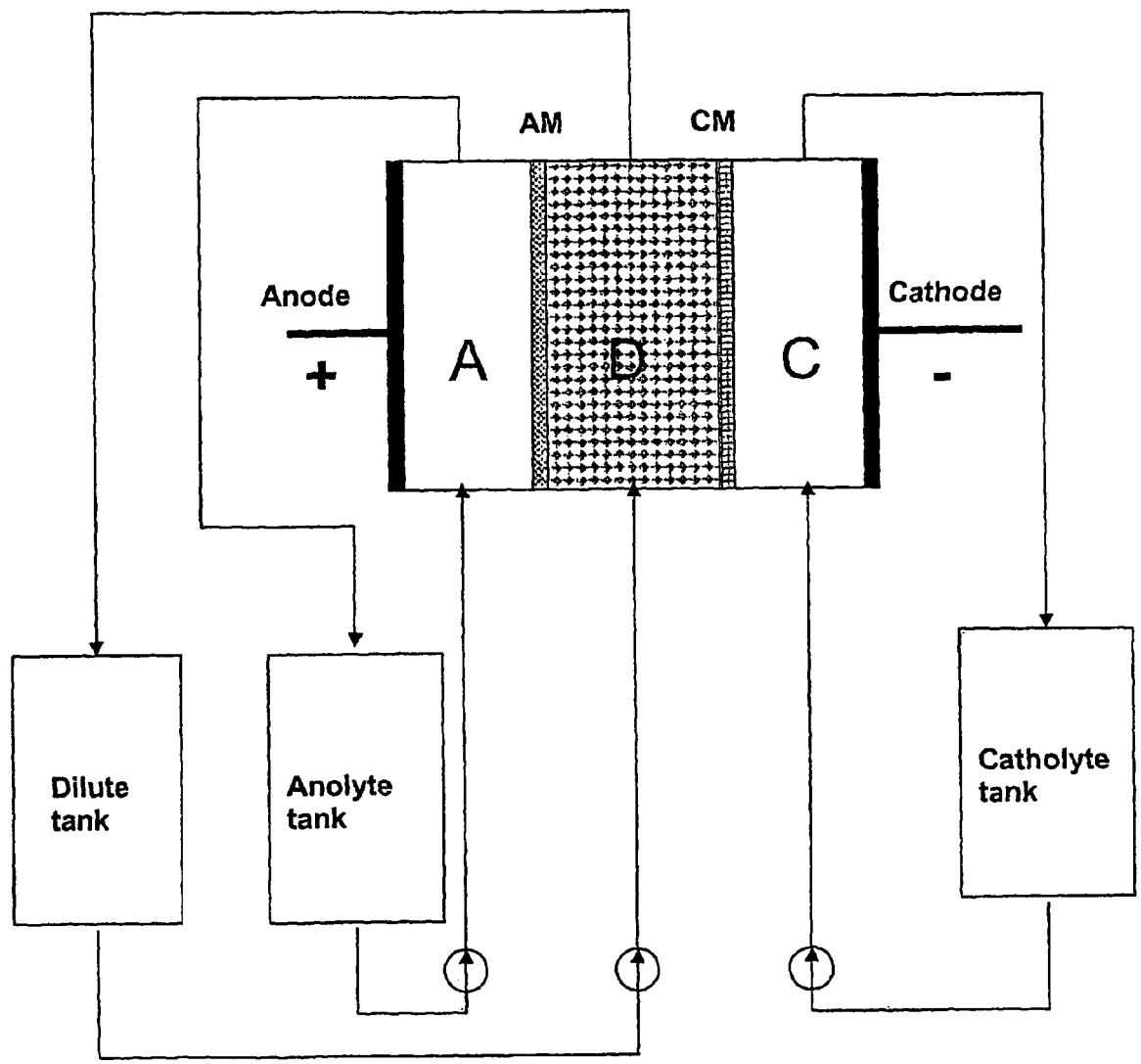
FIG. 3 shows the scheme of pilot testing that was used to demonstrate the process.

In FIG. 3 a catholyte tank is denoted by 1, an anolyte tank is denoted by 2, a diluting tank is denoted by 3, an anolyte compartment is denoted by A, a catholyte compartment is denoted by C, a diluting compartment is denoted by D, an anion membrane is denoted by AM, and a cation membrane is denoted by CM.

TABLE 1

The major specifications of pilot testing

| | |
|---|---|
| Electrodes | Anode: Ti based coated anode (DSA) |
| | Cathode: Graphite |
| Membranes | Anion-exchange membrane |
| | Cation-exchange membrane |
| Compartment volumes | Diluted compartment: 100 × 100 × 7.5 mm |
| | Anolyte compartment: 100 × 100 × 2.5 mm |
| | Catholyte compartment: 100 × 100 × 5.2 mm |
| Volumes of solutions | Diluted tank: 2.000 L |
| | Anolyte tank: 2.000 L |
| | Catholyte tank: 2.000 L |
| Flow model | Recirculation |
| Flow rates | Diluted compartment: 0 to 100 L/h |
| | Anolyte compartment: 0 to 200 L/h |
| | Catholyte compartment: 0 to 250 L/h |

TABLE 2

The major properties of the ion-exchange membranes used for tests

| | | Manufacture Tokuyama Soda | |
|---|---|---|---|
| Types | | AMX strongly basic anion membrane | CMX strongly acidic cation membrane |
| Electric resistance | Ω-cm$^2$ | 2.5-3.5 | 2.5-3.5 |
| Brust strength | kg/cm$^2$ | 4.5-5.5 | 5-6 |
| IX capacity | meq/g | 1.4-1.7 | 1.5-1.8 |
| Thickness | μm | 160-180 | 170-190 |

TABLE 3

The major characteristics of the ion-exchange resins used for tests

| | | Manufacture Dow Chemical | |
|---|---|---|---|
| Types | | A1-400 Gel Strong base I | C-400 Gel Strong acid |
| IX capacity | eq/L | 1.20 | 2.20 |
| Water content | % | 50-60 | 38-45 |
| Particle size | μm | Uniform | Uniform |

TABLE 3-continued

The major characteristics of the ion-exchange resins used for tests

| | | Manufacture Dow Chemical | |
|---|---|---|---|
| Types | | A1-400 Gel Strong base I | C-400 Gel Strong acid |
| Mean | | 400 ± 50 | 400 ± 50 |
| Uniformity | | 1.1 | 1.1 |
| Operating | | | |
| Max. T | ° C. | 60 | 130 |
| pH | | 0-14 | 0-14 |

Example 1

Separation of Boric Acid from Strongly Dissociated Anions

This example demonstrates the weakly dissociated boric acid was separated from strongly dissociated anions such as chloride, nitrate and sulfate. The separation can be carried out in the diluting compartment filled with cation-exchange resin in which both strongly dissociated anions and cations can be separated from the solution, and the most of weakly dissociated boric acid cannot be separated. The separation and recovery of boric acid can be performed in the following diluting compartment filled with anion resin or cation/anion resins. In order to minimise the electrochemical dissociation of boric acid, the density of DC current should be controlled as low as possible. The results in Table 4 indicate that boric acid was well separated from nitrate and sulfate. Lowing the DC current could minimise the electrochemical dissociation of boric acid. It was also shown that the separation of nitrate and sulfate was not significantly affected as the DC current was reduced to that level.

TABLE 4

The separation of boric acid from strongly dissociated anions*

| | Boron | | | Nitrate | | | Sulfate | | |
|---|---|---|---|---|---|---|---|---|---|
| Current A/dm$^2$ | Separat. % | Initial ppm | Final ppm | Separat. % | Initial ppm | Final ppm | Separat. % | Initial ppm | Final ppm |
| 0.64 | 21.6 | 2031 | 1593 | 96.2 | 5.23 | 0.20 | 96.0 | 4.99 | 0.20 |
| 0.10 | 9.8 | 1897 | 1711 | 93.2 | 4.40 | 0.30 | 95.0 | 6.04 | 0.30 |

Note:
*The diluted compartment was filled with only the cation resin C-400.

Example 2

Separation of Boron from Lithium Using Mixed Anion and Cation Resins Filled in the Diluting Compartment The process of boron separation from lithium is demonstrated using mixed resin bed filled in the diluting compartment. As shown in Table 5, boric acid was well separated and recovered by the process. The separation efficiency for both boron and lithium was above 99%. The initial boron concentration of around 2000 ppm could be reduced to less than 5 ppm. The initial lithium concentration of around 5 ppm could be reduced to less than 10 ppb. The lithium concentration in the separated boron solution (anolyte) was less than 20 ppb. This indicated that the selectivity of the separation and the purity of the recovered boron are quite high.

TABLE 5

The efficiency of boron separation from lithium
using a mixed resin bed in diluted compartment*

| | Boron | | | Lithium | | |
|---|---|---|---|---|---|---|
| Test No. | Separation % | Initial conc. ppm | Final conc. ppm | Separation % | Initial conc. ppb | Final conc. ppb |
| 1** | 99.7 | 2000 | 5 | 99.8 | 3600 | 8 |
| 2 | 99.7 | 2019 | 7 | 99.8 | 4850 | 11 |

Notes:
*The resin bed was mixed with the anion resin A1-400 and the cation resin C-400 in ratio of 4 to 1 in volume. The initial anolyte was 0.1 M boric acid and the initial catholyte was 0.1 M lithium hydroxide.
**The cation resin was saturated using lithium before use.

Example 3

Separation of Boron from Lithium Using Anion and Cation Resins Separated in the Diluting Compartment The process of boron separation from lithium is demonstrated using the anion resin was separated from the cation resin in the diluting compartment. As shown in Table 6, boric acid was well separated and recovered using a separated resin bed. Although the separation efficiency for both boron and lithium is similar to the separation process using the mixed resin bed, it has been found that the electric resistance of the system was lower than using the mixed resin bed. Therefore a high density of DC current should be achieved more easily in a system with separated resin bed than in a system with mixed resin bed.

TABLE 6

The efficiency of boron separation from lithium
using a mixed resin bed in diluted compartment*

| | Boron | | | Lithium | | |
|---|---|---|---|---|---|---|
| Test No. | Separation % | Initial conc. ppm | Final conc. ppm | Separation % | Initial conc. ppb | Final conc. ppb |
| 1 | 99.9 | 2000 | 2 | 99.9 | 5030 | 2 |
| 2 | 99.3 | 2000 | 14 | — | — | — |

Notes:
*The cation resin C-400 was filled in front of the diluted compartment separated from the anion resin A1-400, and the ratio of anion resin to cation resin was 2:1 in volume. The initial anolyte was 0.1 M boric acid and the initial catholyte was 0.1 M lithium hydroxide.

Example 4

The Concentrating Limit of Boron in the Process of Separation and Recovery

The concentrating limit of boron in anolyte was tested for the process of separation and recovery. The concentration of boron in the anolyte compartment is affected by the solubility of boron, mass transfer through the anion membrane and electrical migration. The results (Table 7) show that the initial solution containing boric acid of 2000 ppm mixed with lithium hydroxide of 5 ppm in the diluting compartment could be concentrated as high as 3,5 times in the anolyte compartment. This concentration of recovered boron in the anolyte corresponds to over 80% of the boric acid solubility at 20° C. (Perry, 1997).

TABLE 7

The limit of boron concentration in
the collecting solution (anolyte)

| | Boron | Final boron concentration | | |
|---|---|---|---|---|
| Test No. | separation % | In diluted compart. (ppm) | In anolyte compart. (ppm) | Concentrating (final/initial) |
| 1 | 99.3 | 13 | 2974 | 1.47 |
| 2 | 93.7 | 126 | 7077 | 3.56 |

Example 5

The Comparison of Various of Ion-Exchange Resins Used for the Separation Process The comparison of various ion-exchange resins used for the boron separation is shown in Table 8. All the ion-exchange resins are the commercial products of the Dow Chemical. These resins represent different types of resin combinations that should be important for boron separation. The A1-400 and C-400 are gel ion-exchange resins. These resins have relatively larger ion-exchange capacities, and the same mean particle size for both anion and cation resins. The 550A LC NG and 557C NG are nuclear grade gel ion-exchange resins having a normal particle distribution for anion and cation resins. The MSA and MSC are macroporous ion-exchange resins having relatively large difference in the particle size between the anion resin and cation resin. As shown in Table 9, the combination of A1-400 (anion resin) with C-400 (cation resin) provided a better current efficiency and more suitable current density than other resin combinations. Because the A1-400 and C-400 have the same mean diameter and uniform particle size, this should benefit for flow distribution, electrical migration and mass transfer.

TABLE 8

The comparison of various ion-exchange resins used for the separation process

| Resins* | Boron separation % | Average current efficiency % | Average current density A/dm$^2$ |
|---|---|---|---|
| A1-400 + C-400 | 99.7 | 74.2 | 0.84 |
| 550A LC NG + 575C NG | 99.6 | 60.3 | 0.40 |
| MSA + MSC | 99.7 | 58.7 | 0.92 |

Note:
*The anion and cation resins were mixed in a volume ration of 4 to 1.

Example 6

The Comparison of Boron Separation with or without Ion-Exchange Resin Filled in the Diluting Compartment The tests were performed using the pilot testing without ion-exchange resin filled in the diluting compartment. The other conditions were kept the same as that with ion-exchange resins filled in the compartment. As expected the separation of boric acid was very low in this system. However the separation of lithium was performed very well. It was find that the pH of the bulk solution remained in a weakly acidic level in the diluting compartment and the conductivity of the solution was quite low. These resulted in a very weak dissociation of boric acid and high electrical resistance for the system. This may be a good explain for a very low current density during the separation as indicated in Table 9. The low current density made the electrochemical dissociation of boric acid to be difficult.

TABLE 9

The boron separation by the test pilot without ion-exchange resin filled in the electrochemical cell

| Boron | | | Lithium | | | Current |
|---|---|---|---|---|---|---|
| Separation % | Initial conc. ppm | Final conc. ppm | Separation % | Initial conc. ppb | Final conc. ppb | Average A/dm$^2$ |
| 15.2 | 2019 | 1754 | 99.9 | 4850 | 7 | 0.07 |

REFERENCES

CRC, 2001. CRC Handbook of Chemistry Physics. 82nd Edition (2001-2002), p. 8-44-45, CRC Press LLC.
Ganizi, G. C., Wilkns, F., and Giuffrida, A. J., 1994. Electrodeionization apparatus, U.S. Pat. No. 5,308,466, 1994-05-03.
Ganizi, G. C., Wilkns, F., Giuffrida, A. J. and Griffin, C., 1994. Electrodeionization apparatus, U.S. Pat. No. 5,131, 6637, 1994-05-31.
Giuffrida A. J., Jha, A. D. and Gannizi, G. C. 1990. Electrodeionization method and apparatus, U.S. Pat. No. 4,925, 541, 1990-05-15.
Giuffrida A. J. 1990. Electrodeionization method and apparatus, U.S. Pat. No. 493,160, 1990-06-05.
Kollsman, P. 1954. Electrodalytic apparatus, U.S. Pat. No. 2,689,826, 1954-09-21.
Kollsman, P. 1957. Method and apparatus for treating ionic fluids by dialysis, U.S. Pat. No. 2,815,320, 1957-12-03.
Melnik, L., Vysotskaja, O., and Kornilovich, B. 1999. Boron behavior during desalination of sea and underground water by electrodialysis. Desalination, 124, 125-130.
Nadav, N. 1999. Boron removal from seawater reverse osmosis permeate utilizing selective ion exchange resin. Desalination 124, 131-135.
Perry, R. H. 1997. Perry's Chemical Engineers' Handbook, 7$^{th}$ Edition, McGraw-Hill, cop., New York.
Prates, D., Chilion-Arias, M. F., and Rodriguez-Pastor, M. 2000. Analysis of the influence of pH and pressure on the elimination of boron in reverse osmosis. Desalination, 128, 269-273.
Simonnot, M.-O., Castel, C., Nicolai, M., Rosin, C., Savolin, M. and Jauffret, H. 2000. Boron removal from drinking water with a boron selective resin: Is the treatment really selective?Water Research, 34 (1), 109-116.
Sperssard, J. E. 1970. Investigation of borate equilibrium in neutral salt solutions. Journal of Inorganic Nuclear Chemistry, 32, 2601.
Sprongthorpe, P., Giuffrida, A. J., Wilkins, F., Dimascio, F. And Ganzi G. C. 1999. Electrodeionzation apparatus and method, U.S. Pat. No. 5,868,915, 1999-02-09.
Wilcox, D., Montalvo, M., Meyers, P. and Walsh, S. 2000. Boron removal from high-purity water by selective ion exchange Ultrapure Water, July/August, 40-51.

The invention claimed is:
1. A process for the separation and recovery of boron from an aqueous solution of nuclear power plant wastewater containing non-dissociated boric acid, using a five-compartment electrochemical cell comprising a first and second diluting compartment, a first and second anolyte compartment, one catholyte compartment, and one anode and two cathodes, whereby a first cation-exchange membrane separates the catholyte compartment from the first diluting compartment, a first anion-exchange membrane separates the first diluting compartment from the first anolyte compartment, a second anion-exchange membrane separates the second anolyte compartment from the second diluting compartment, a second cation-exchange membrane separates the second diluting compartment from the catholyte compartment, and an anode separates the first and second anolyte compartments, the anode being provided with a hole for the flow of anolyte between said first and second anolyte compartments, the method comprising:

feeding untreated aqueous solution to the first diluting compartment for separating strongly dissociated anions by electrical migration performed in the first diluting compartment, wherein the first diluting compartment is filled with cation-exchange material only, and separating dissociated cations by ion-exchange/electrical migration in said first diluting compartment;

feeding the aqueous solution treated in the first diluting compartment to the second diluting compartment for separating boron by electrochemical/chemical dissociation, ion-exchange/adsorption, and electrical migration performed in said second diluting compartment, wherein said second diluting compartment is filled with anion-exchange material or a mixture of anion- and cation-exchange materials, or layers of anion- and cation-exchange materials separated from each other;

recovering the separated cations into the catholyte compartment of the electrochemical cell;

recovering the separated boron into at least one of the anolyte compartments of the electrochemical cell;

recirculating the anolyte in said at least one anolyte compartment recirculating the catholyte in said catholyte compartment; and recirculating the diluted solution in said first and second diluting compartments if necessary.

2. The process according to claim 1, wherein the first and second diluting compartments, are separated from the anode by the first and second anion-exchange membranes, respectively, and wherein the first and second diluting compartments are separated from the cathodes by the first and second cation-exchange membranes, respectively.

3. The process according to claim 1, wherein DC potential is applied between the anode and the cathode.

4. The process according to claim 1, wherein the first anolyte compartment is used for collecting the separated strongly dissociated anions, and the second anolyte compartment is used for recovering the separated boron.

5. The process according to claim 4, wherein the dissociated anions are selected from the group consisting of chloride, nitrate and sulfate-ions.

6. The process according to claim 1, wherein the catholyte compartment is used for collecting the separated dissociated cations.

7. The process according to claim 1, wherein an initial anolyte is a pure solution of boric acid, and an initial catholyte is a pure solution of a given dissociated cation that may be recovered, and the initial concentrations of the anolyte and catholyte are appropriately adjusted for performing the separation and recovery of boron and a given dissociated cation.

8. The process according to claim 1, wherein the ion-exchange materials filled in the diluting compartment(s) is (are) ion-exchange resins having uniform particle size and the same mean diameter of resin beads for both anion and cation resins.

9. The process according to claim 1, wherein the separation of boron from strongly dissociated anions is performed before the separation of boron in the second diluting compartment.

10. The process according to claim 1, wherein electrochemical dissociation of boric acid in the first diluting compartment is reduced by controlling a density of DC current during the separation of boron with strongly dissociated anions, the applied current density being controlled below 0.1 $A/dm^2$, and the electrochemical dissociation of boric acid is reduced below 15% as an initial concentration of boron is about 2000 ppm.

11. The process according to claim 1, wherein a DC current applied to the electrochemical cell is appropriately adjusted to keep a balance among an electrochemical dissociation of boric acid, the electrical migration of anions and water splitting for a regeneration of ion-exchange materials.

12. The process according to claim 1, wherein the separation and recovery of boron can be performed for an aqueous solution with a range of initial concentration of boron from about two thousand ppm to about twenty ppm.

13. The process according to claim 1, wherein a high efficiency of boron separation is achieved, the separation percentage of boron being over 95%.

14. The process according to claim 1, wherein a high concentrating limit is achieved for boron recovery, the concentration of boron in the anolyte being up to 80% of the solubility of boric acid.

15. The process according to claim 1, wherein the separation and recovery of boron and a given cation may be performed at the same time.

16. The process according to claim 1, wherein the treatment of the aqueous solution is performed in a recirculating model, a follow-through model or a partial-recirculating model.

17. The process according to claim 1, wherein the dissociated cations are $^7Li^+$-ions.

* * * * *